United States Patent
Todd et al.

(10) Patent No.: US 10,324,962 B1
(45) Date of Patent: Jun. 18, 2019

(54) UNSTRUCTURED DATA VALUATION

(71) Applicant: EMC Corporation, Hopkinton, MA (US)

(72) Inventors: Stephen Todd, Shrewsbury, MA (US); Jeroen van Rotterdam, Berkeley, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 404 days.

(21) Appl. No.: 14/863,783

(22) Filed: Sep. 24, 2015

(51) Int. Cl.
- *G06F 17/30* (2006.01)
- *G06F 16/31* (2019.01)
- *G06F 16/338* (2019.01)
- *G06F 16/33* (2019.01)

(52) U.S. Cl.
CPC .......... *G06F 16/31* (2019.01); *G06F 16/338* (2019.01); *G06F 16/3344* (2019.01)

(58) Field of Classification Search
CPC ...................................................... G06F 17/30
USPC .......................................................... 707/723
See application file for complete search history.

(56) References Cited

U.S. PATENT DOCUMENTS

| | | | |
|---|---|---|---|
| 6,715,145 B1 | 3/2004 | Bowman-Amuah | |
| 7,574,426 B1* | 8/2009 | Ortega | G06F 16/3329 |
| 7,752,195 B1* | 7/2010 | Hohwald | G06F 16/22 707/715 |
| 7,890,451 B2 | 2/2011 | Cancel et al. | |
| 7,970,729 B2 | 6/2011 | Cozzi | |
| 8,561,012 B1 | 10/2013 | Holler et al. | |
| 8,719,255 B1* | 5/2014 | Pope | G06F 16/9535 707/716 |
| 8,812,496 B2* | 8/2014 | Renders | G06F 16/14 707/728 |
| 9,009,169 B2* | 4/2015 | Redfern | G06F 16/24578 707/749 |
| 9,384,226 B1* | 7/2016 | Goel | G06F 16/9535 |
| 9,606,828 B2* | 3/2017 | Ghosh | G06F 9/45558 |
| 9,851,997 B2* | 12/2017 | Gough | G06F 9/45558 |
| 2011/0078603 A1* | 3/2011 | Koomullil | G06F 16/24 715/769 |
| 2014/0052489 A1 | 2/2014 | Prieto | |
| 2014/0324856 A1* | 10/2014 | Lahiani | G06Q 30/0241 707/736 |

OTHER PUBLICATIONS

U.S. Appl. No. 13/923,791 filed in the name of Stephen Todd et al. on Jun. 21, 2013 and entitled "Data Analytics Computing Resource Provisioning."
U.S. Appl. No. 14/744,886 filed in the name of Marina Zeldin et al. on Jun. 19, 2015 and entitled "Infrastructure Trust Index."

(Continued)

*Primary Examiner* — Kim T Nguyen
(74) *Attorney, Agent, or Firm* — Ryan, Mason & Lewis, LLP

(57) ABSTRACT

A set of domain aware tokens generated for a given unstructured data set are obtained. A value is computed for the given unstructured data set as a function of the set of domain aware tokens and a given context of interest. The value represents a valuation of the unstructured data set for the given context of interest. A placement of the unstructured data set within a data storage environment may be determined based on the computed value.

20 Claims, 5 Drawing Sheets

(56) References Cited

OTHER PUBLICATIONS

Wikipedia, "Value Chain," https://en.wikipedia.org/w/index.php?title=Value_chain&printable=yes, Jun. 6, 2016, 7 pages.
Doug Laney, "The Economics of Information Assets," The Center for Infonomics, http://www.smarter-companies.com/group/icpractitioners/forum/topics/abstract-and-slides-for-today-s-session-on-infonomics-by-doug, Sep. 13, 2011, 22 pages.
Nicole Laskowski, "Six Ways to Measure the Value of Your Information Assets," Tech Target, http://searchcio.techtarget.com/feature/Six-ways-to-measure-the-value-of-your-information-assets?vgnextfmt=print, May 8, 2014, 3 pages.
R. Shumway et al., "White Paper: Infonomics in Practice: Realizing the True Value of Business Data," Cicero Group, http://cicerogroup.com/app/uploads/2015/09/Infonomics-in-Practice.pdf, 2015, 4 pages.
E. Kupiainen et al., "Why Are Industrial Agile Teams Using Metrics and How Do They Use Them?" Proceedings of the 5th International Workshop on Emerging Trends in Software Metrics, Jun. 2014, 7 pages.
D. Hartmann et al., "Appropriate Agile Measurement: Using Metrics and Diagnostics to Deliver Business Value," Proceedings of the Conference on AGILE, Jul. 2006, 6 pages.
T. Lehtonen et al., "Defining Metrics for Continuous Delivery and Deployment Pipeline," Proceedings of the 14th Symposium on Programming Languages and Software Tools, Oct. 2015, 16 pages.

\* cited by examiner

UNSTRUCTURED DATA VALUATION

FIELD

The field relates generally to data processing and, more particularly, to data valuation.

BACKGROUND

As unstructured content repositories such as, by way of example only, Hadoop file systems (HDFS) and object stores, become prevalent, more and more corporations are ingesting enormous amounts of unstructured content into data lake architectures that they maintain. A data lake is typically considered to be a functionally centralized data storage system for unstructured and structured data. These data lake architectures have little to no knowledge of the business or economic value of the content, especially unstructured content, within the data lake.

SUMMARY

Embodiments of the invention provide techniques for data valuation.

For example, in one embodiment, a method comprises the following steps. A set of domain aware tokens generated for a given unstructured data set are obtained. A value is computed for the given unstructured data set as a function of the set of domain aware tokens and a given context of interest. The value represents a valuation of the unstructured data set for the given context of interest.

In another embodiment, a value is computed for a given unstructured data set as a function of a given context of interest, wherein the value represents a valuation of the unstructured data set for the given context of interest. A placement of the unstructured data set within a data storage environment is determined based on the computed value.

These and other features and advantages of the invention will become more readily apparent from the accompanying drawings and the following detailed description.

DETAILED DESCRIPTION

Figure 1:
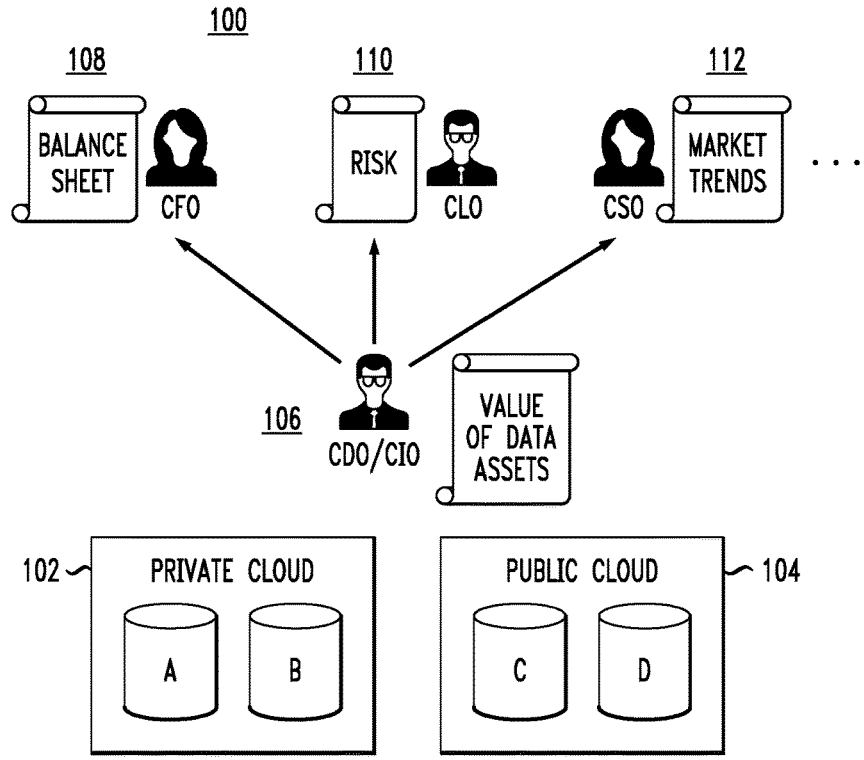
FIG. 1 illustrates a data valuation use case according to an embodiment of the invention.

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As used herein, the following terms and phrases have the following illustrative meanings:

"metadata" illustratively refers to data that describes or defines data;

"valuation" illustratively refers to a computation and/or estimation of something's worth or value; in this case, data valuation is a computation and/or estimation of the value of a data set for a given context;

"context" illustratively refers to surroundings, circumstances, environment, background, settings, and/or the like, that determine, specify, and/or clarify something; in this case, for example, context is used to determine a value of data;

"structured data" illustratively refers to data that resides in fixed fields within a document, record or file, e.g., data contained in relational databases and spreadsheets; and "unstructured data" illustratively refers to data that is not considered structured data (in which case, some "semi-structured" data asset may also be considered unstructured data).

It is realized herein that the valuation of unstructured data assets is a struggle for a variety of use cases (e.g., data insurance, overall portfolio valuation). Illustrative embodiments use a variety of techniques to create domain specific tokens for unstructured content that facilitate a data valuation framework. More particularly, illustrative embodiments provide techniques for extracting metadata from raw unstructured content, via tokenization, domain mapping, and other techniques, and leverage new approaches that tie data assets to data in a way that establishes per-data set valuation. For example, given that information technology (IT) infrastructures are largely segregated from knowledge of financial statements, market trends, and other measures of corporate business value, illustrative embodiments provide a connection between a given application data set and the overall economic value that it currently represents to the corporation. It is to be appreciated that the value connected to a data set in accordance with embodiments described herein is not limited to economic value.

FIG. 1 highlights a use case which is illustratively referenced throughout the detailed description to highlight problems caused by a lack of valuation methods for unstructured content in conventional data lake environments. It is to be appreciated that embodiments of the invention are not intended to be limited to this specific use case.

As shown in data environment 100, data repositories (or data stores) A and B are part of a private cloud environment 102, and data repositories (or data stores) C and D are part of a public cloud environment 104 (wherein each of A, B, C and D is considered to contain one or more data sets or data assets). A private cloud environment is a cloud infrastructure that is also known as an internal or enterprise cloud, and typically resides on a corporation's intranet or corporation-hosted data center where the data is protected behind a firewall and the infrastructure is managed by the corporation. A public cloud environment is a multi-tenant cloud infrastructure that is not managed by any of the tenants but rather by a third party provider and where data for each tenant is stored on infrastructure shared by the multiple tenants. The combination of private cloud environment 102 and public cloud environment 104 is typically referred to as a hybrid cloud environment. The data stores A, B, C and D may be considered part of a corporation's data lake architecture.

Also shown in the illustrative use case for data environment 100 are a chief data/information officer (CDO/CIO) 106, a chief financial officer (CFO) 108, a chief legal officer (CLO) 110, and a chief strategy officer (CSO) 112.

For example, it is assumed that CFO 108 has access to all unstructured documents/content/data sets relating to the financial health of the company. CSO 112 is assumed to have access to market directions/analyst reports. CLO 110 tracks business areas such as corporate risk, intellectual property, etc., and thus is assumed to have access to data that helps in performing these duties. CDO/CIO 106 is assumed to have knowledge of and access to corporate data assets scattered throughout the hybrid cloud environment.

One main goal is that a CDO/CIO can keep an up-to-date list of valued data sets that can be fed to other corporate level teams (CFO, CLO, CSO, etc.) in a manner that is applicable to their line of business. However, given the lack of data valuation frameworks in conventional cloud environments, the following problems are common:

No programmatic method to calculate business value. A CDO may have a list of all (or many) data sets that are available for analysis, sale, deletion, migration, etc. However, the CDO has no ability to assign economic or business value to that data in a programmatic fashion, and is often left to guess or estimate the value, which becomes impossible as data volume increases. Illustrative embodiments, as will be explained, provide programmatic methods to calculate business value.

No contextual business value capability. The value of a data asset may vary based on the context of the request. There is currently no conventional method to feed this context into the valuation process and provide different value statements back to a client. Illustrative embodiments, as will be explained, provide contextual business value capability.

No method for calculating data value without rescan. Any algorithm that wishes to calculate business value on a data set will necessarily require a full scan of the content (similar to a full backup versus incremental). This long process will be unduly painful if different clients request data valuation in different contexts. Illustrative embodiments, as will be explained, provide methods for calculating data value without rescan.

No method for observing/recording fluctuation in business value. Given that there may be changes in areas such as: (i) the financial health of a company; and/or (b) changes in the market landscape for any given vertical, there is no way to dynamically adjust the value of a given data set in the face of those changes. Illustrative embodiments, as will be explained, provide methods for observing/recording fluctuation in business value.

No method for business value modification due to ingest. As new data flows into an unstructured data store (e.g., data store A), there is no ability to dynamically reflect the new value of data store A based on the increased volume. Illustrative embodiments, as will be explained, provide methods for business value modification due to ingest.

No dashboard for overall data valuation reporting and/or prioritization. Given the lack of valuation capabilities mentioned above, there is no ability for a dashboard tool (user interface) to report on things such as: (i) data value fluctuation over time; (ii) prioritization of high value data sets versus low(er) value data sets; and (iii) summation, average, and ranges of overall data value of data sets. Illustrative embodiments, as will be explained, provide a dashboard for overall data valuation reporting and/or prioritization.

Illustrative embodiments provide solutions to the above and other problems in private and/or public cloud environments by providing a data valuation framework. As will be explained in further detail, embodiments comprise a workflow of algorithms that produce a chain of results leading to the assignment of business value to unstructured data sets. A first part of this workflow is illustratively depicted in FIG. 2.

Figure 2:
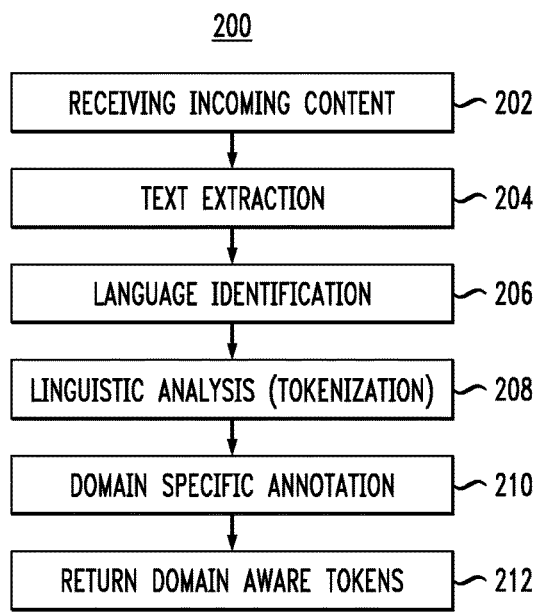
FIG. 2 illustrates domain specific mapping methodology according to an embodiment of the invention.

More particularly, FIG. 2 illustrates domain specific mapping according to an embodiment of the invention. As shown in methodology 200, incoming content is obtained in step 202. The incoming data can be any unstructured data set, by way of example, a document (record, file, etc.). The document can be text or include text with other media (multimedia).

In step 204, text extraction is performed on the document. Text extraction (also more broadly called "information extraction") is the task of automatically extracting information from unstructured (and/or semi-structured) machine-readable documents. In most cases, this task involves processing human language texts using natural language processing (NLP). However, in multimedia documents, processing such as automatic annotation and content extraction from images/audio/video can also be considered text/information extraction.

In step 206, language identification is performed on the extracted text. In NLP, language identification is the task of determining which natural language given content is in. There are several conventional statistical approaches using different techniques to classify the data that can be employed to perform language identification.

Once the language of the extracted text is identified, linguistic analysis or tokenization is performed in step 208. Tokenization is an NLP technique that generates tokens from the extracted text using processes such as stemming and lemmatization. A main goal of stemming and lemmatization is to reduce inflectional forms and derivationally related forms of a word to a common base form. For example, different forms of a word may be used in a document, e.g., processes, processed, processing. Likewise, different derivations of words may be used in a document, e.g., memorial, memorize, memorization. In many situations, it would be useful for a search for one of these words to return documents that contain another word in the set.

Accordingly, stemming is a process that removes (chops off or stems) the ends (or some part) of words in order to obtain the common base form. Lemmatization is a process of performing a vocabulary and morphological analysis of words, normally seeking to remove inflectional endings only and to return the base or dictionary form of a word, which is known as the lemma. Thus, the stemming and lemmatization processes result in tokens that are the common base forms of words from the extracted text. For the example sets of words above, returned tokens may respectively be process and memori. Note that the language of the text is important to be identified (from step 206) since knowledge of the language, and thus language-specific rules, serves to instruct the tokenization method (step 208) on how to chop a word, as well as on vocabulary and morphological rules for the specific language. Some well-known tokenization methods (also known as stemmer algorithms) include the Porter stemmer algorithm, the Lovins stemmer algorithm, and the Paice stemmer algorithm. One or more of these algorithms, as well as alternative tokenization methods, can be employed as part of step 208.

Next in methodology 200, the tokens returned in step 208 for the given document are annotated in a domain-specific manner in step 210. Text annotation tools are known to classify words based on some criterion. In illustrative embodiments, a text annotation tool can be adapted to assign (tag or map) each token to a domain specific taxonomy. In alternative embodiments, a training set of documents for a specific domain and a set of vectorized tokens may be used. By way of example only, the token process could be annotated as "legal" (as in service of process) and/or as "finance" (as in a fiscal compliance process). In any case, each token returned in step 208 is annotated and mapped to at least one domain in step 210 to return domain aware tokens in step 212.

Figure 3:
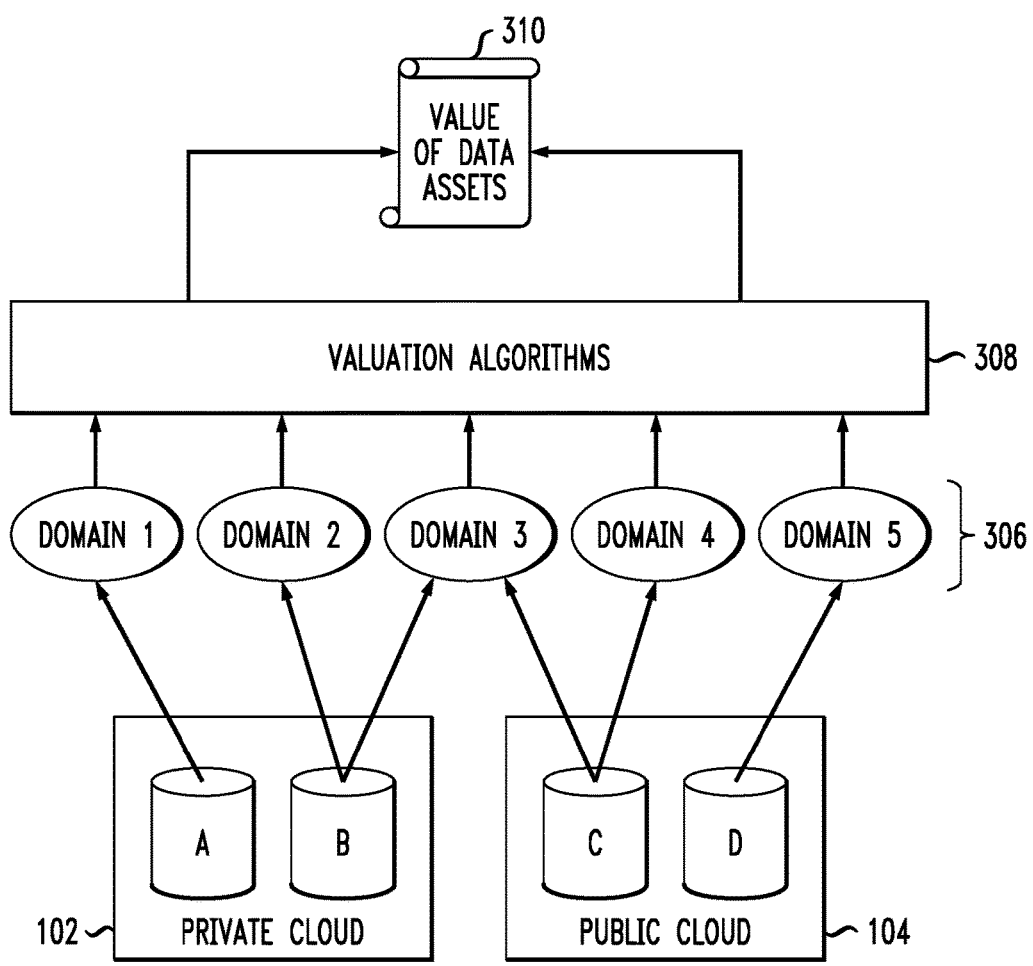
FIG. 3 illustrates a data valuation methodology according to an embodiment of the invention.

Advantageously, as shown, methodology 200 combines aspects of natural language processing, language detection, stemming algorithms, and domain-specific mapping, resulting in tokens that can then be provided to valuation algorithms, as shown in FIG. 3.

FIG. 3 illustrates a data valuation methodology 300 according to an embodiment of the invention. It is assumed that data repositories A and B that are part of private cloud environment 102 and data repositories C and D that are part of public cloud environment 104 each contain one or more data sets (e.g., documents) that would benefit from data valuation.

Assume that each of the documents in data repositories A, B, C and D are processed using methodology 200 to generate domain aware tokens. These domain aware tokens are grouped in domains 306 (domain 1 through domain 5). That is, domains 1 through 5 are the subject matter domains to which the tokens are mapped (e.g., legal, finance, etc.). Despite being mapped to domains, the tokens still maintain their identification with the document from which they belong. By way of example only, metadata can be generated, such as an identifier (ID), and associated with (stored, attached, etc.) a token that identifies the document from which the token was derived.

The domain aware tokens are provided to valuation algorithms 308. A different valuation algorithm may be used for each context. As will be explained in detail, a value V is returned for each document based on the domain aware tokens for that document that are provided to the valuation algorithms 308. These values are denoted as 310 in FIG. 3. Thus, advantageously, domain-specific analysis results in a set of domain specific mapping results, some unique to each data set and some shared. The valuation algorithms 308 convert domains to business value, as will be explained.

Assume each value V of content c for context x is calculated by the valuation algorithms 308 as follows:

$$V(c,x) = f(\{\text{outside factors}\}, \{\text{domain-specific-tokens}\}, \{\text{domain-specific-token-metadata}\})$$

where f( ) represents a function, and where domain-specific-token-metadata can be a computed value from the tokens. One example of domain-specific-token-metadata is a distance between two tokens. For example, the distance may be a cosine distance based on two vectorized tokens which illustrates how closely two tokens are semantically related. Metadata may also be system type metadata (e.g., time, date, etc. associated with the system doing the computations, as well as document identifiers for the tokens as mentioned above) and/or user-generated (custom) metadata. Outside factors, as will be explained, are the context provided by the user (or other system) using the system. Then, embodiments build one or more indices of the relevant domain specific tokens and factors to re-evaluate the value V of content for each given context, as will be illustrated in FIG. 4.

As a quantitative example of computing a value V of content c, assume a set of values for a context x for a given domain specific training set of n-skip-k-grams. First, calculate a cosine distance between each n-skip-k-gram in the content and the training set. Next, for each n-skip-k-gram, take the highest scoring cosine distance (the most similar construct) and add them all up. Each individual value in the training set may have a multiplier that depends on one or more outside factors. For instance, when there is a major security breach in the industry, it might give certain values a boost factor.

In the above example, a large document with a high number of n-skip-k-grams may return a high value V based on more cosine distances being summed up. However, a small document with more similar constructs scoring higher cosine distances may also return a high value V.

Figure 4:
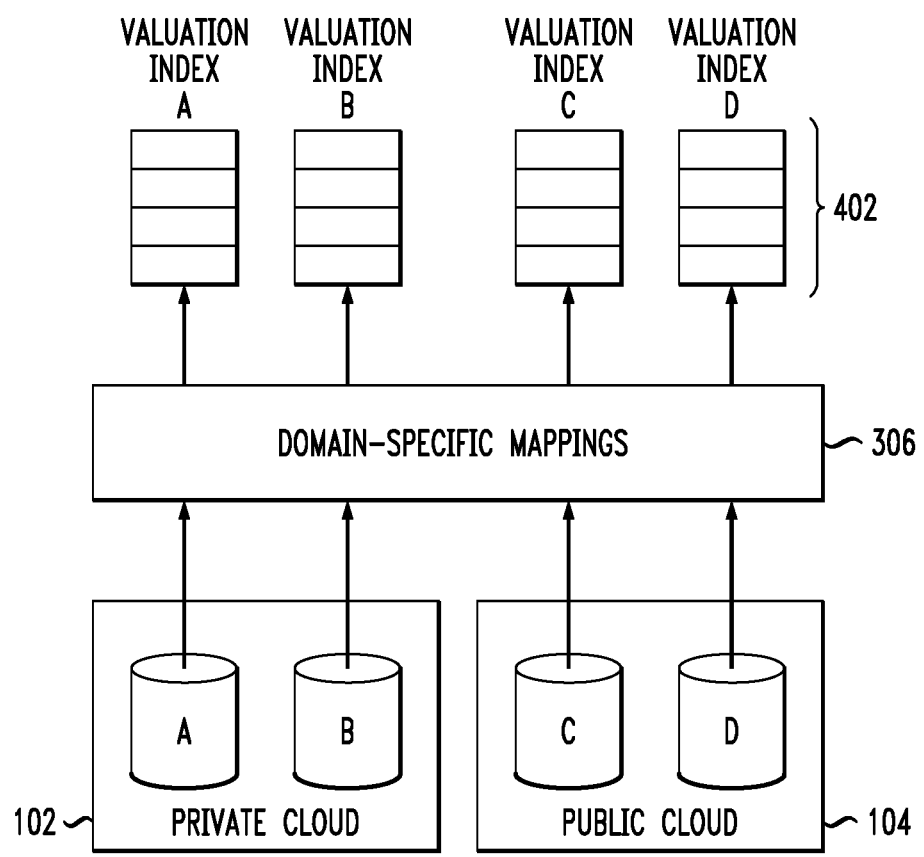
FIG. 4 illustrates data valuation indices according to an embodiment of the invention.

Valuation algorithms are not static since the valuation of content can depend on a wide variety of rapidly changing outside factors (i.e., changing context). Because of that, illustrative embodiments build valuation indices from the extracted domain specific tokens that are re-evaluated when valuation parameters change. Instead of re-processing the content, this re-evaluation phase can work directly against one or more of the indices. FIG. 4 illustrates the creation 400 of valuation indices 402 for each data set shown in FIG. 3. That is, each index for a given data set includes the values V calculated for the given data set as well as each domain aware token associated with that data set (and any corresponding metadata). Advantageously, the indices contain the initially-computed value V for a given document as well as re-evaluated (re-computed) values V for the given document as outside factors change (more generally, as valuation parameter changes). As an illustrative example, an index may store a relationship between a document and an outside factor, as well as the associated computed values. Thus, when the outside factor changes, all valuations that were computed with it are recomputed based on the individual valuations of the associated n-skip-k-grams retrieved from the index.

Figure 5:
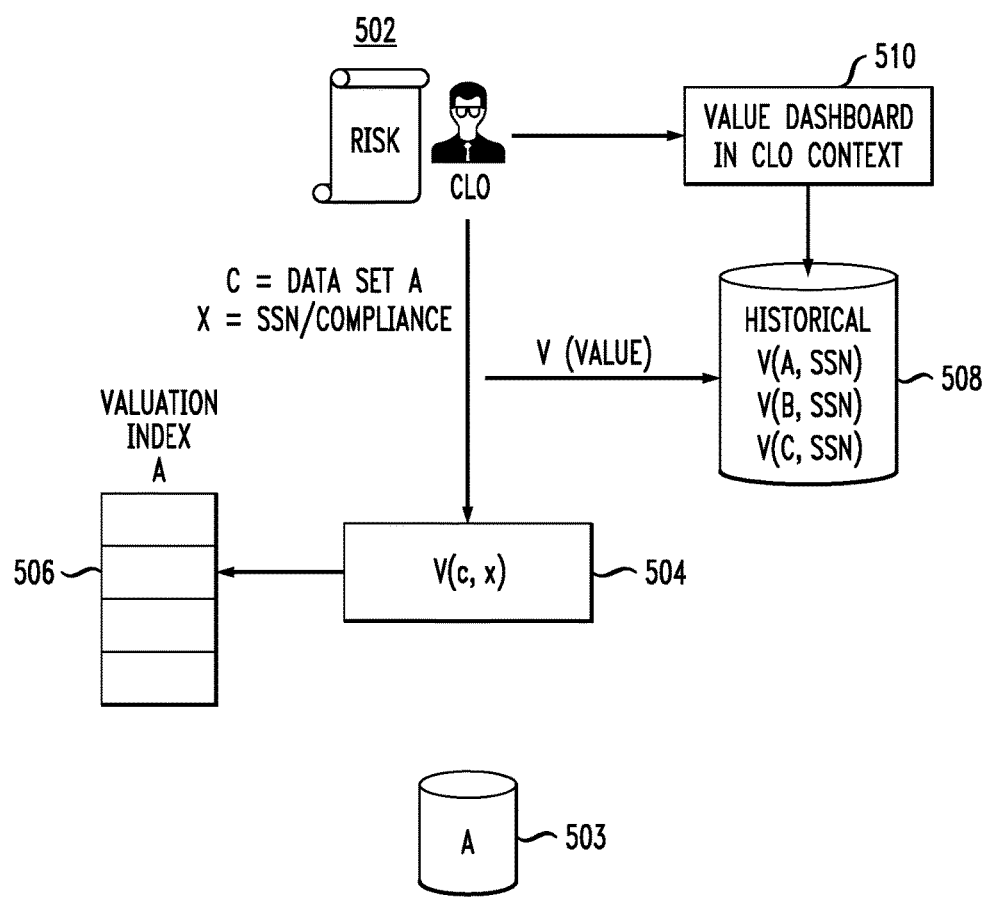
FIG. 5 illustrates a data valuation dashboard according to an embodiment of the invention.

For a given context x, a dashboard (e.g., an interface displayable to a user or other system) is created that tracks current and historical content value for that given context. This dashboard leverages the valuation algorithms 308 on a per-client basis. Process 500 in FIG. 5 illustrates CLO 502 seeking to determine how much risk (e.g., negative valuation) data sets possess with a context of whether or not the data sets contain social security numbers (SSNs).

Thus, as shown, CLO 502 queries the system to return results against the data sets (c) based on the context (x) of interest. Step 504 searches the index for each data set based on V(c,x) where c is data set A (503 in this example) and x is the context of whether or not the data set contains SSNs. It is to be appreciated that the values V(c,x) for each data set as a function of the given context have already been previously calculated and stored in their respective indices. The index 506 for data set A is queried, and values are returned. This is done for all data sets of interest to CLO 502. Data store 508 shows the past (historical) values V for each data set in the context of whether or not the data set contains SSNs. Dashboard 510 is the mechanism for making the query and displaying results to CLO 502. This same approach can be used for a "super-user" dashboard context, in which a C-level executive (e.g., CDO) has visibility across all content for all contextual business scenarios.

Figure 6:
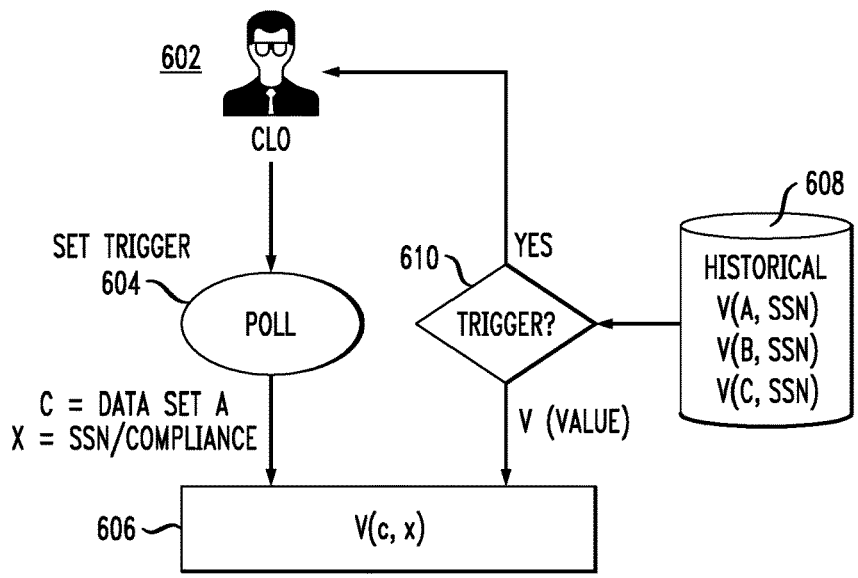
FIG. 6 illustrates a trigger on valuation change methodology according to an embodiment of the invention.

During the re-evaluation process, if re-evaluation using an identical context yields a markedly different value result (e.g., a significant amount of new, valuable data has arrived for that context), a comparison against historical value statements can trigger event-based notifications using a variety of approaches (e.g., threshold crossed, percentage increase/decrease in value, etc.). FIG. 6 illustrates this trigger process 600, in accordance with an illustrative embodiment, in which a CLO 602 initiates a polling process 604, which in turn regularly polls new values V(c,x) 606 for a data set (e.g., data set A) for a given context (e.g., SSN/compliance), compares them to historical values stored in data store 606, and triggers (610) a notification to CLO 602 accordingly.

Illustrative embodiments also provide for dynamic placement of content based on valuation. Re-computing valuations (re-evaluation) can lead to actions within the system, for instance, decisions to move data between the private cloud environment (e.g., the value of the content rises dramatically) and the public cloud environment (e.g., the value of the content decreases dramatically).

Re-evaluation can occur when content changes. In such case, the system re-computes the tokens and tokens' metadata before computing the new value V for this specific content only. When outside factors change, the system re-computes all valuations for all content files (documents) using the valuation indices.

Using the trigger process described above in FIG. 6, the polling process 604 can be configured to automatically call a set of software-defined data center (SDDC) application programming interfaces (APIs) which cause the migration of: (a) the application; or (b) the application data set; or (c) both.

In addition to the CLO use case highlighted above, several more example use cases for data valuation methodologies and systems are described below. Again, it is to be understood that embodiments are not limited to these illustrative use cases.

Public Sector Traffic Analysis.

Assume that traffic data streams into unstructured files. A data scientist values files that display a high degree of traffic congestion on any given day. As traffic data is ingested regularly (e.g., daily, hourly, etc.), new valuation indices are created and the same valuation algorithms are run against the indices to determine differences in value.

Genomic Analysis.

A genomic data scientist cares more about ingested data that has certain markers closer together than others. Markers can often end up as tokens in the valuation index, and as different combinations of genetic markers are considered, the value based on those markers can be calculated from the index (without the need to re-process all genomic data).

Financial Disbursement Division.

A financial corporation receives SSN data about SSNs of deceased employees and retirees. This data has high value to a corporation that no longer has to pay benefits (e.g., social security checks). However, this type of file has little value to a marketing organization and the valuation in a marketing context will be significantly lower.

Figure 7:
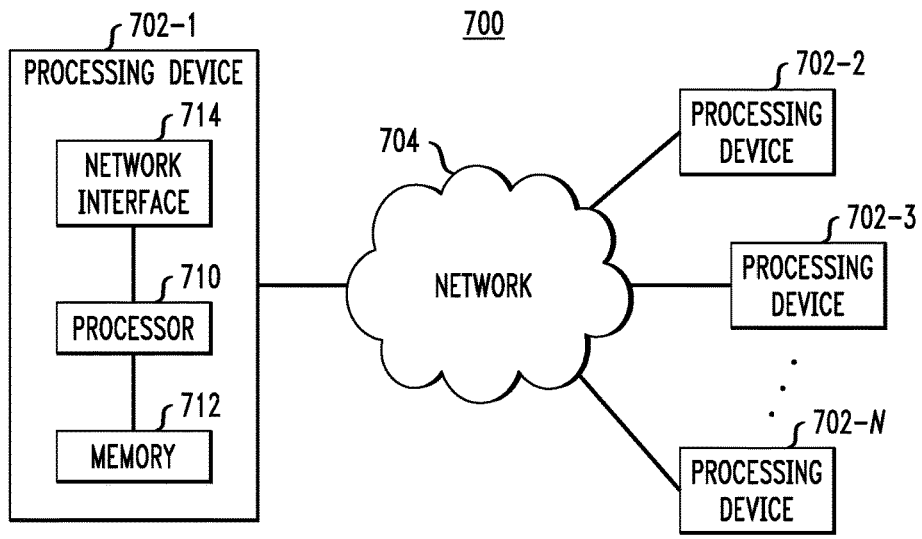
FIG. 7 illustrates a processing platform used to implement a cloud infrastructure environment in which data valuation techniques are implemented according to an embodiment of the invention.

As an example of a processing platform on which a cloud infrastructure environment with data valuation (system and methodologies) according to illustrative embodiments can be implemented is processing platform 700 shown in FIG. 7.

The processing platform 700 in this embodiment comprises a plurality of processing devices, denoted 702-1, 702-2, 702-3, ... 702-N, which communicate with one another over a network 704. It is to be appreciated that the data valuation methodologies described herein may be executed in one such processing device 702, or executed in a distributed manner across two or more such processing devices 702. The cloud infrastructure environment (e.g., private cloud 102/public cloud 104) may also be executed in a distributed manner across two or more such processing devices 702. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 7, such a device generally comprises at least one processor and an associated memory, and implements one or more functional modules for instantiating and/or controlling features of systems and methodologies described herein. Multiple elements or modules may be implemented by a single processing device in a given embodiment.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random access memory (RAM), read-only memory (ROM) or other types of memory, in any combination. The one or more software programs when executed by a processing device such as the processing device 702-1 causes the device to perform functions associated with one or more of the components/steps of system/methodologies in FIGS. 1-6. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the network 704 and other system components. Such circuitry may comprise conventional transceivers of a type well known in the art.

The other processing devices 702 (702-2, 702-3, ... 702-N) of the processing platform 700 are assumed to be configured in a manner similar to that shown for computing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the data valuation system and cloud infrastructure described herein may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

Furthermore, it is to be appreciated that the processing platform 700 of FIG. 7 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 700 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the data valuation system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    obtaining a set of domain aware tokens generated for a given unstructured data set;
    computing a value for the given unstructured data set as a function of the set of domain aware tokens and a given context of interest, wherein the value represents a valuation of the unstructured data set for the given context of interest;
    constructing a valuation index for the given unstructured data set, wherein the valuation index comprises the computed value for the unstructured data set and the set of domain aware tokens associated with the unstructured data set;
    re-computing the value of the valuation index for the given unstructured data set when at least one of the unstructured data set changes and the given context changes; and
    providing a notification when a re-computed value for the given context of interest changes from the originally computed value by a predefined amount;
    wherein computing the value for the unstructured data set further includes:
        computing the value as a function of metadata associated with the set of domain aware tokens; and
        applying a multiplier that depends on one or more outside factors affecting the value; and
    wherein the steps are executed by at least one processing device comprising a processor operatively coupled to a memory.

2. The method of claim 1, further comprising querying the index, via an interface, wherein the query returns values, via the interface, associated with the data set and the context of interest specified in the query.

3. The method of claim 1, further comprising generating the set of domain aware tokens for the given unstructured data set by one or more of text extraction, language identification, linguistic analysis, and domain specific annotation.

4. The method of claim 3, wherein the linguistic analysis comprises one or more stemming algorithms.

5. The method of claim 1, further comprising:
    determining a placement of the unstructured data set within a data storage environment based on the computed value and the re-computed value.

6. The method of claim 5, wherein the data storage environment comprises a hybrid cloud infrastructure comprising a private cloud environment and a public cloud environment.

7. The method of claim 6, wherein determining a placement of the unstructured data comprises migrating the unstructured data set from one of the private cloud environment and the public cloud environment to the other of the private cloud environment and the public cloud environment.

8. The method of claim 7, wherein the unstructured data set is migrated to the private cloud environment from the public cloud environment upon determination that the value of the unstructured data set has increased.

9. The method of claim 7, wherein the unstructured data set is migrated to the public cloud environment from the private cloud environment upon determination that the value of the unstructured data set has decreased.

10. An article of manufacture comprising a processor-readable storage medium having encoded therein executable code of one or more software programs, wherein the one or more software programs when executed by one or more processing devices implement steps of:
 obtaining a set of domain aware tokens generated for a given unstructured data set;
 computing a value for the given unstructured data set as a function of the set of domain aware tokens and a given context of interest, wherein the value represents a valuation of the unstructured data set for the given context of interest;
 constructing a valuation index for the given unstructured data set, wherein the valuation index comprises the computed value for the unstructured data set and the set of domain aware tokens associated with the unstructured data set;
 re-computing the value of the valuation index for the given unstructured data set when at least one of the unstructured data set changes and the given context changes; and
 providing a notification when a re-computed value for the given context of interest changes from the originally computed value by a predefined amount;
 wherein computing the value for the unstructured data set further includes:
  computing the value as a function of metadata associated with the set of domain aware tokens; and
  applying a multiplier that depends on one or more outside factors affecting the value.

11. The article of claim 10, further comprising querying the index, via an interface, wherein the query returns values, via the interface, associated with the data set and the context of interest specified in the query.

12. The article of claim 10, further comprising generating the set of domain aware tokens for the given unstructured data set by one or more of text extraction, language identification, linguistic analysis, and domain specific annotation.

13. The article of claim 10, further comprising determining a placement of the unstructured data set within a data storage environment based on the computed value and the re-computed value.

14. The article of claim 13, wherein the data storage environment comprises a hybrid cloud infrastructure comprising a private cloud environment and a public cloud environment.

15. The article of claim 14, wherein determining a placement of the unstructured data comprises migrating the unstructured data set from one of the private cloud environment and the public cloud environment to the other of the private cloud environment and the public cloud environment.

16. A system comprising:
 one or more processors operatively coupled to one or more memories configured to:
 obtain a set of domain aware tokens generated for a given unstructured data set;
 compute a value for the given unstructured data set as a function of the set of domain aware tokens and a given context of interest, wherein the value represents a valuation of the unstructured data set for the given context of interest;
 construct a valuation index for the given unstructured data set, wherein the valuation index comprises the computed value for the unstructured data set and the set of domain aware tokens associated with the unstructured data set;
 re-compute the value of the index for the unstructured data set when at least one of the unstructured data set changes and the given context changes; and
 provide a notification when a re-computed value for the context of interest changes from the originally computed value by a predefined amount;
 wherein to compute the value for the unstructured data set further includes:
  computing the value as a function of metadata associated with the set of domain aware tokens; and
  applying a multiplier that depends on one or more outside factors affecting the value.

17. The system of claim 16, wherein the value is computed also as a function of metadata associated with the set of domain aware tokens.

18. The system of claim 16, wherein the one or more processors operatively coupled to the one or more memories are further configured to query the index, via an interface, wherein the query returns values, via the interface, associated with the data set and the context of interest specified in the query.

19. The system of claim 16, wherein the one or more processors operatively coupled to the one or more memories are further configured to generate the set of domain aware tokens for the given unstructured data set by one or more of text extraction, language identification, linguistic analysis, and domain specific annotation.

20. The system of claim 19, wherein the linguistic analysis comprises one or more stemming algorithms.

* * * * *